(12) United States Patent
Todd

(10) Patent No.: US 9,684,712 B1
(45) Date of Patent: *Jun. 20, 2017

(54) ANALYZING TENANT-SPECIFIC DATA

(75) Inventor: Stephen J. Todd, Shrewsbury, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/892,069

(22) Filed: Sep. 28, 2010

(51) Int. Cl.
*G06F 7/00* (2006.01)
*G06F 17/00* (2006.01)
*G06F 17/30* (2006.01)

(52) U.S. Cl.
CPC .............................. *G06F 17/30666* (2013.01)

(58) Field of Classification Search
CPC ...... G06F 3/0613; G06F 3/0631; G06F 3/067; G06F 9/505; G06F 17/30873; G06F 17/30067; G06F 17/30994; G06F 17/30557; G06F 17/30368
USPC ............. 713/176; 715/744; 726/11; 707/661, 707/694, 647, 679; 709/223
See application file for complete search history.

(56) References Cited

U.S. PATENT DOCUMENTS

| | | | |
|---|---|---|---|
| 7,539,824 B2 * | 5/2009 | Lolayekar et al. ............ | 711/148 |
| 7,647,243 B2 * | 1/2010 | Woolston .................... | 705/26.41 |
| 7,721,154 B1 * | 5/2010 | Jaamour ............. | G06F 11/3624 714/38.14 |
| 7,873,992 B1 * | 1/2011 | Daily et al. ...................... | 726/11 |
| 8,190,714 B2 * | 5/2012 | Davidson .............. | G06F 9/4416 707/999.001 |
| 8,863,251 B1 * | 10/2014 | Junod ...................... | G06F 21/31 726/27 |
| 2003/0208595 A1 * | 11/2003 | Gouge .................... | H04L 67/16 709/225 |
| 2004/0024720 A1 * | 2/2004 | Fairweather ............ | G06F 8/427 706/46 |
| 2006/0098572 A1 * | 5/2006 | Zhang et al. .................. | 370/229 |
| 2008/0049616 A1 * | 2/2008 | Kamath et al. ................ | 370/235 |
| 2008/0049786 A1 * | 2/2008 | Ram et al. ..................... | 370/468 |
| 2009/0164522 A1 * | 6/2009 | Fahey ........................ | 707/104.1 |
| 2009/0164790 A1 * | 6/2009 | Pogodin ........................ | 713/176 |
| 2010/0005443 A1 * | 1/2010 | Kwok .................... | G06Q 10/10 717/100 |
| 2010/0223364 A1 * | 9/2010 | Wei .............................. | 709/220 |
| 2010/0293147 A1 * | 11/2010 | Snow ................ | G06F 17/30067 707/640 |
| 2011/0047246 A1 * | 2/2011 | Frissora et al. ............... | 709/219 |
| 2011/0209069 A1 * | 8/2011 | Mohler ......................... | 715/744 |
| 2012/0075490 A1 * | 3/2012 | Tsai ................... | G06Q 30/0241 348/222.1 |

\* cited by examiner

*Primary Examiner* — Susan Chen

(74) *Attorney, Agent, or Firm* — Krishnendu Gupta; John T. Hurley

(57) ABSTRACT

A method for use in analyzing tenant-specific data is disclosed. First data for a first tenant and second data for a second tenant is stored in a multi-tenant data storage system. A first portion of the first data is selected. Based on the selection, the first portion of the first data is copied to a data store that is specific to the first tenant. Data analysis techniques are applied to the data store.

20 Claims, 5 Drawing Sheets

| Allocate | E-Mail | Wizard | ? » | ✕ |

Specify Storage Configuration

Step 3 of 5

Number of mailboxes: 2
Average mailbox size: 5 MB ▾

Audit/Mining? ☐ —420

Hide Preview

The configuration will consist of the following Storage Groups:

| Name | Description | Database Size | Log Size | Public Folder Size |
|---|---|---|---|---|
| SG1 | My SG1 | 10 MB | 1 MB | None |

Hide Modify

Name:
Description:

[Update] [Add] [Remove] [Revert]

Database size: 0 ▾ KB ▾
Log size: 0 ▾ KB ▾
Public folder size: 0 ▾ KB ▾

[< Back] [Next >] [Finish] [Cancel]  —430

ANALYZING TENANT-SPECIFIC DATA

BACKGROUND

Technical Field

The present invention relates to analyzing tenant-specific data.

Description of Related Art

As it is generally known, "cloud computing" typically refers to the use of remotely hosted resources to provide services to customers over one or more networks such as the Internet. Resources made available to customers are typically virtualized and dynamically scalable. Cloud computing services may include any specific type of application. Some cloud computing services are, for example, provided to customers through client software such as a Web browser. The software and data used to support cloud computing services are located on remote servers owned by a cloud computing service provider. Customers consuming services offered through a cloud computing platform need not own the physical infrastructure hosting the actual service, and may accordingly avoid capital expenditure on hardware systems by paying only for the service resources they use, and/or a subscription fee. From a service provider's standpoint, the sharing of computing resources across multiple customers (i.e., "tenants") improves resource utilization. Use of the cloud computing service model has been growing due to the increasing availability of high bandwidth communication, making it possible to obtain response times from remotely hosted cloud-based services similar to those of services that are locally hosted.

In some cases, cloud computing infrastructures may include one or more servers and/or data storage systems that may be used to provide a service to a given customer. A server or data storage system, for example, may be used in providing a given customer with data storage service, e.g., that the customer can access from the customer's own servers. In other cases, cloud computing infrastructures often use virtual machines to provide services to customers. A virtual machine is a completely software-based implementation of a computer system that executes programs like an actual computer system. One or more virtual machines may be used to provide a service to a given customer, with additional virtual machines being dynamically instantiated and/or allocated as customers are added and/or existing customer requirements change. Each virtual machine may represent all the components of a complete system to the program code running on it, including virtualized representations of processors, memory, networking, storage and/or BIOS (Basic Input/Output System). Virtual machines can accordingly run unmodified application processes and/or operating systems. Program code running on a given virtual machine executes using only virtual resources and abstractions dedicated to that virtual machine. As a result of such "encapsulation", a program running in one virtual machine is completely isolated from programs running on other virtual machines. However, the virtual machines may be running on the same underlying hardware. In the context of cloud computing, customer-specific virtual machines can be employed to provide secure and reliable separation of code and data used to deliver services to different customers.

A virtual machine monitor manages the allocation of physical resources for the virtual machines executing in the virtual environment in a way that maintains code and data isolation between virtual machines. Physical resources that are allocated to the virtual machines include processor, memory, and other physical resources. In addition to physical resource virtualization and allocation, the virtual machine monitor may also provide virtual machines with other specific services, such as transport services enabling communication between virtual machines.

High bandwidth and virtualization may be utilized to create a multi-tenant cloud environment that provides and maintains access for one or more tenants to a shared back-end storage infrastructure. How the back-end storage infrastructure resources are allocated and used depends on the particular implementation.

SUMMARY OF THE INVENTION

A method for use in analyzing tenant-specific data is disclosed. First data for a first tenant and second data for a second tenant is stored in a multi-tenant data storage system. A first portion of the first data is selected. Based on the selection, the first portion of the first data is copied to a data store that is specific to the first tenant. Data analysis techniques are applied to the data store.

BRIEF DESCRIPTION OF THE DRAWINGS

Features and advantages of the present invention will become more apparent from the following detailed description of exemplary embodiments thereof taken in conjunction with the accompanying drawings in which:

FIGS. 4 and 5 provide example embodiments of the invention specific to an email application.

DETAILED DESCRIPTION OF EMBODIMENT(S)

Described below is a technique for use in analyzing tenant-specific data. In accordance with at least one embodiment of the technique, a tenant-specific store is provided to facilitate electronic data auditing/mining.

Figure 1:
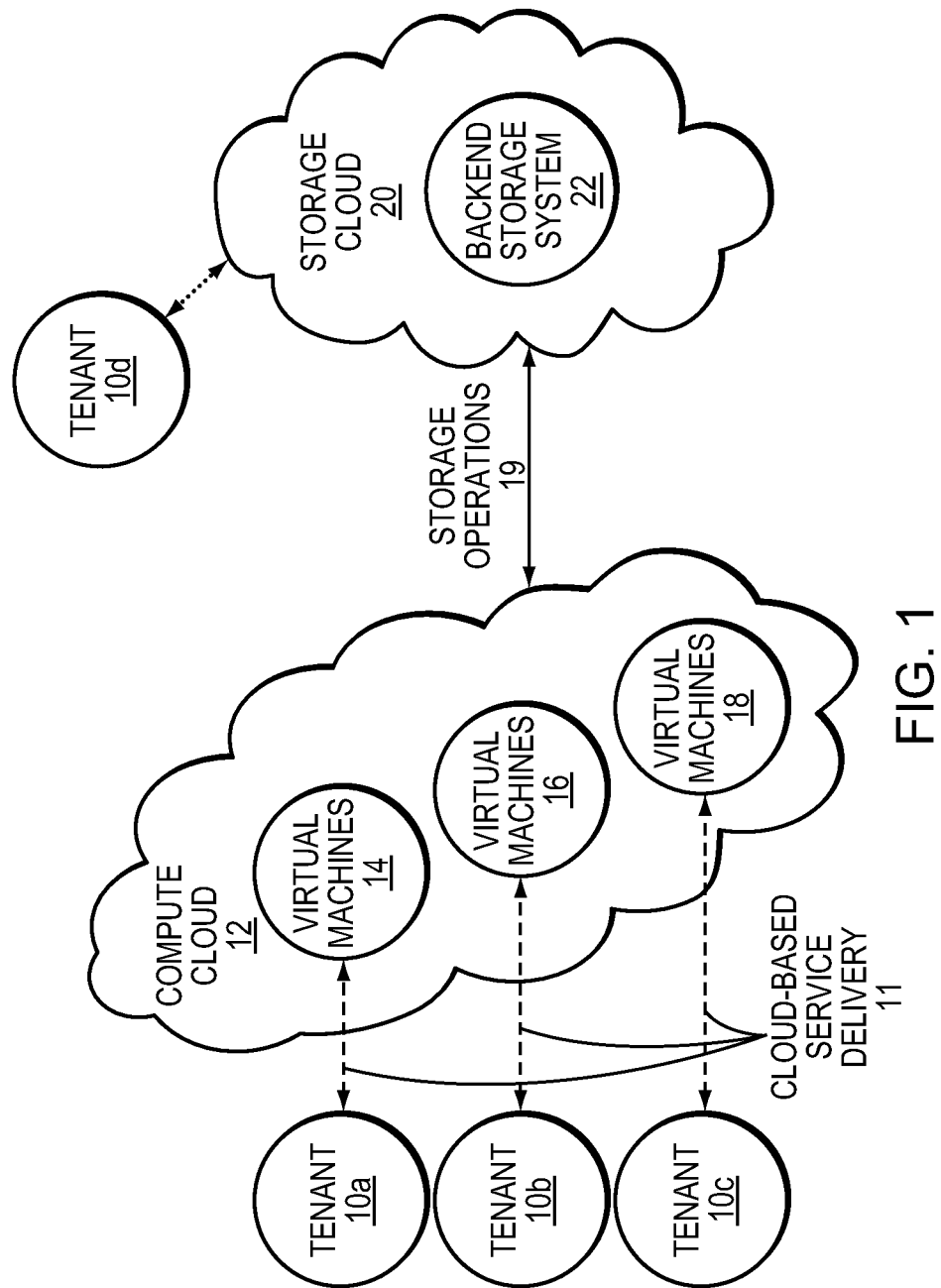
FIG. 1 is an illustrative embodiment of a cloud-based storage environment.

FIG. 1 is an illustrative embodiment of a cloud-based storage environment. As shown in FIG. 1 a number of Tenants (e.g., Tenant 10*a*, Tenant 10*b*, Tenant 10*c*, and Tenant 10*d*), receive one or more services that are provided remotely at least in part by the Compute Cloud 12. The services are delivered from the Compute Cloud 12 to the Tenants over one or more communication networks, such as the Internet, as shown for purposes of illustration in FIG. 1 by Cloud-Based Service Delivery 11. The services provided by Compute Cloud 12 to Tenants may include any specific type of service, including, for example, common business applications or the like that are accessed over the Internet through a Web browser executing on a user's client computer system, or any other specific type of service. The software providing the services to the Tenants executes on server computer systems managed by a cloud service provider business entity, for example within a data center owned and operated by the cloud service provider.

In order to provide each one of the Tenants with individualized service, cloud services may provide tenants, such as Tenant 10*d*, with services for the purpose of storing data. In such a case, there may not be a virtual machine associated with the tenant. Rather, the tenant may be, for example, associated with one or more virtual storage devices, such as one or more virtual disks, which utilize the underlying hardware in Storage Cloud 20.

In addition or alternatively, to provide Tenants with individualized service, the Compute Cloud 12 may instantiate one or more virtual machines for each one of the Tenants. As shown in FIG. 1, Virtual Machines 14 are used exclusively to provide a service to Tenant 10*a*, Virtual Machines 16 are used exclusively to provide a service to Tenant 10*b*, and Virtual Machines 18 are used exclusively to provide a service to Tenant 10*c*. By dedicating a set of virtual machines to each individual tenant, the Compute Cloud 12 ensures that any computational activity (e.g. application program execution) involved in servicing one tenant cannot interfere with service delivery to another tenant, and that all such computational activity is private to each tenant. Moreover, as the computation needs of a given tenant change, the number of virtual machines assigned to that tenant can be dynamically adjusted as needed within the Compute Cloud 12.

Data used by cloud-based services provided to Tenants is stored within a Storage Cloud 20, which may similarly include a number of storage devices and associated server computer systems also managed by the same cloud service provider business entity, within the same or another data center owned and operated by the cloud service provider. The Storage Cloud 20 is shown including at least one Backend Storage System 22, including one or more network file systems and/or database management systems. The system may convey high level storage object commands (e.g. file system and/or database commands) and associated results between virtual machines in the Compute Cloud 12, or a tenant's computer system, and Backend Storage System 22, as shown in FIG. 1 by Storage Operations 19, for example over a private LAN or other type of private network that is under the control of the cloud service provider. The disclosed system also supports partitioning of storage resources within the Storage Cloud 20 (e.g., directories, databases, file systems) into private, tenant-specific back-end storage resource sets that are each only accessible to corresponding ones of the Tenants. Various specific types of back-end storage resources may be partitioned into the customer-specific back-end storage resource sets of the disclosed system, including disk sets, storage object sets, directory sub-trees, database tables or portions of database tables, and/or instances of file systems or databases.

Those skilled in the art will recognize that each of Tenants may include one or more tenant computer systems and/or intelligent electronic devices, such as desktop, laptop, or palmtop computer systems, personal digital assistants, cell phones, or other electronic devices. Each such tenant system may include or control a display device capable of displaying a graphical user interface including data and/or information generated at least in part based on a cloud-based service provided through the Compute Cloud 12 and/or Storage Cloud 20, such as a liquid crystal display (LCD), cathode ray tube (CRT), interferometric modulator display (IMOD), light emitting diode (LED), or the like. Those skilled in the art will further recognize that the aforementioned tenant systems, as well as server computer systems in the Compute Cloud 12 and Storage Cloud 20, may each include one or more processors, program and/or data storage, such as memory, for storing program code executable on such processors, and input/output devices and/or interfaces. The systems within each of the Tenants, the Compute Cloud 12, and the Storage Cloud 20, are all communicably connected by one or more communication networks, such as, for example, a Local Area Network (LAN), the Internet, and/or some other specific type of communication network.

Conventionally, for at least some purposes, the use of such cloud-based systems may present challenges to a business' ability to fully manage and examine its data. These challenges may result in the failing of an electronic audit, which in some cases can result in adverse legal and/or business consequences. If a business has outsourced its business data or IT service to a cloud provider (public or private), the business may need to be able to ensure that its data is auditable. Similarly, a business may desire to have a certain level of control over its data to easily perform data mining services to extract patterns from its data.

In at least some conventional cases, the virtualized environment of a cloud-based service where multiple tenants share the same back-end resources can hinder a tenant's and cloud provider's auditing and mining capabilities. For instance, conventionally, an issue of scale and security is presented when a tenant's data that must be audited or mined is intermingled with large quantities of data belonging to other tenants within the same data storage system or systems. Moreover, conventionally, the data may be stored in such a way that is complex and difficult to consolidate. These issues largely result from the lack of control and transparency available to the tenant when data is stored in a conventional cloud environment. In other words, in at least some such conventional cases it may be very difficult for a tenant to convince auditors or itself that its data is properly isolated, cannot be viewed or altered by others, and is of sufficient integrity.

Object addressable storage (OAS) systems offer benefits that allow a cloud service provider, in accordance with the technique described herein, to clearly delineate, audit, and mine tenant content. OAS systems receive and process access requests that identify a data unit or other content unit (also referred to as an object) using an object identifier, rather than an address that specifies where the data unit is physically or logically stored in the storage system such as provided in a block Input/Output (I/O) storage system. One example of an OAS system is a content addressable storage (CAS) system. In a CAS system, the object identifiers that identify content units are content addresses. A content address is an identifier that is computed, at least in part, from at least a portion of the content, which can be data and/or metadata, of its corresponding unit of content.

OAS systems provide a convenient mechanism for associating metadata with content, and do so far more simply and efficiently than other types of storage architectures (e.g., block I/O storage systems or file system storage architectures). An example technique for associating metadata with content in an OAS system is the eXtensible Access Method (XAM) proposal that is being developed jointly by members of the storage industry and is proposed as a standard. In accordance with XAM, an "XSET" can be defined to include one or more pieces of content and metadata associated with the content, and the XSET can be accessed using a single object identifier (referred to as an XUID). OAS systems are further described in Van Riel et al., U.S. Pat. No. 7,634,630 B1 issued Dec. 15, 2009, which is hereby incorporated herein by reference.

Figure 2:
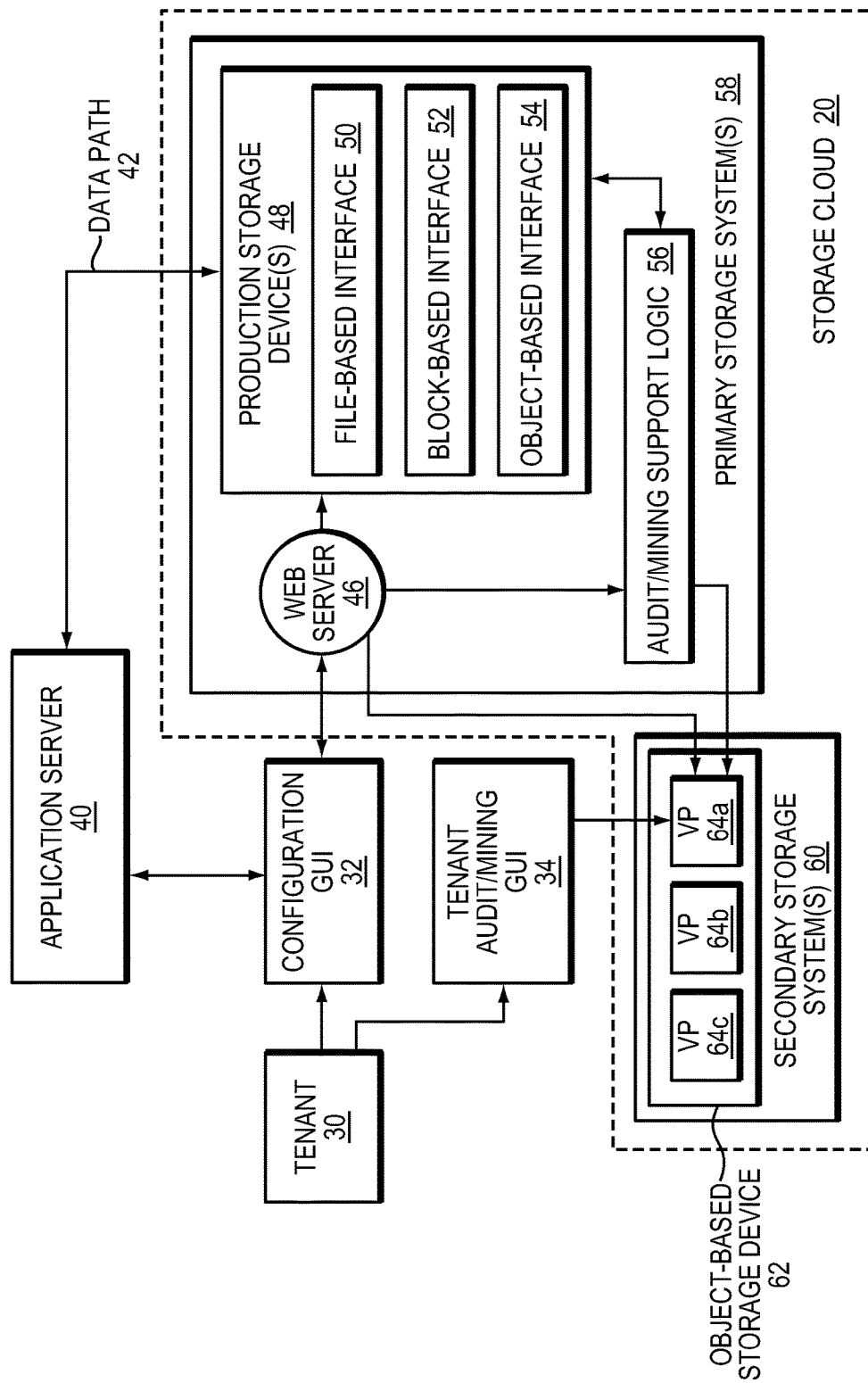
FIG. 2 is a block diagram illustrating an example embodiment of a system that may be used in connection with performing one or more implementations of the invention.

OAS systems further provide the benefits of tenant isolation, time stamping on ingest, proof of authenticity, and retention policies, all of which improves auditing and mining capabilities. Tenant isolation helps ensure data integrity by segregating data on a per tenant basis (physically and/or logically) and establishing access rules for the data. In at least one embodiment, tenant isolation may be achieved by providing a tenant-specific data store on a secondary data storage system (e.g., an OAS system) separate from a primary data storage system as can be seen in FIG. 2. In this embodiment, the tenant-specific data store may be located within the secondary data storage system with other tenant-specific data stores. In an alternative embodiment, depending on the capabilities of Primary Data Storage System(s) 58, the data stores may be located within Primary Data Storage System(s) 58. The location of the tenant-specific data store and the form of segregation may be adjusted based on certain requirements such as tenant, data, or system requirements.

In at least one embodiment, tenant isolation may be accomplished by the use of virtual pools, e.g., within the secondary data storage system. A virtual pool is a logical grouping of storage resources and/or content units, which may be grouped based on any suitable criterion or criteria. For example, in at least one embodiment, virtual pools may be defined based on the identity of a tenant to which the virtual pool is allocated and each of the virtual pools may be allocated so that a tenant is only permitted to access content units in virtual pools that are allocated to it, and is not permitted to access content units in virtual pools that are not allocated to it. Each virtual pool is provided with a name or identifier, an identification of the capabilities to be applied to content units in the virtual pool, and a technique for authentication and/or authorization for servers, application programs, or users seeking access to content units within the virtual pool. In addition, for embodiments wherein virtual pools are implemented by segregating storage system resources, the administration and creation of a virtual pool may also include a mapping from the virtual pool to the storage system resources used to store the content units included therein. In some embodiments, tracking, reporting, and analysis can be performed separately for each virtual pool.

OAS systems may also provide the benefit of timestamping and check-summing tenant data automatically upon ingest. These two features provide proof of originality as it can be trusted that the data is authentic and that the data has not been tampered with. Data maintenance can also be ensured with retention attributes such as "never delete."

These OAS system features described above facilitate electronic data auditing and mining. Further explanation will be provided with regard to FIG. 2, a block diagram illustrating an example embodiment of a system that may be used in connection with performing one or more implementations of the current techniques.

Tenant 30, in the embodiment illustrated by FIG. 2, is provided with Configuration GUI 32, which is in communication with Application Server 40 and Web Server 46. Alternatively, Tenant 30 may use a command line interface to communicate with Application Server 40 and Web Server 46. Web Server 46 may be located within Primary Storage System(s) 58, which may be located within Storage Cloud 20. Web Server 46 may communicate with other devices within Storage Cloud 20 such as Production Storage Device(s) 48, Audit/Mining Support Logic 56, and Secondary Storage System(s) 60.

Production Storage Device(s) 48 may handle various storage provisioning and configuration requests made by Web Server 46. Depending on each specific request (e.g., the application that is the subject of the request), storage space within Production Storage Device(s) 48 may be provisioned and configured to use one or more interfaces such as File-Based Interface 50, Block-Based Interface 52, and Object-Based Interface 54. File-Based and Block-Based refer to example alternative interface protocols for data storage devices that are available in addition to the Object-Based interface protocol described above. Data requests (e.g., I/O requests) from Application Server 40 may also be made to Production Storage Device 48, through Data Path 42, once provisioned. In some embodiments, such requests may rely on various communication standards such as Internet Small Computer System Interface (iSCSI) or Fibre Channel (FC).

Audit/Mining Support Logic 56 includes software that selects data and information from Production Storage Device 48 to be copied to a different data store location or device such as Object-Based Storage Device 62, which may be included in Secondary Storage System(s) 60. As explained further below, the data that is selected may depend on one or more predefined, user-defined, and/or application-specific policies. Object-Based Storage device 60 may also, for example, utilize virtual pool provisioning to facilitate certain types of data analysis (e.g., data auditing and mining). Thus, Object-based Storage Device 62 may have one or more virtual pools as represented by VP 64a, VP 64b, and VP 64c. It should be noted that the functionalities provided by Object-Based Storage Device 62 may additionally or alternatively be provided from within Primary Storage System(s) 58 depending on the capabilities of Primary Data Storage System(s) 58.

Tenant 30 may also be provided with Tenant Audit/Mining GUI 34 for administering data auditing and mining analysis on data stored in a tenant-specific exclusive virtual pool such as, for example, VP 64a. In some embodiments, VP 64b and VP 64c may be exclusively associated with other tenants. Tenant 30 may alternatively be provided with a command line interface for tenant audit and mining in place of Tenant Audit/Mining GUI 34.

Application Server 40 is a software framework dedicated to the execution of procedures for supporting one or more applications such as an email application, and may have corresponding auditing and/or mining support logic located within Audit/Mining Support Logic 56. For instance, in one embodiment, Application Server 40 may be an email application server such as a MICROSOFT EXCHANGE (trademark of Microsoft Corporation) server and Audit/Mining Support Logic 56 may have software associated with the email application that selects, for example, new email messages that have been stored in Production Storage Device 48 to be copied to the user's exclusive virtual pool data store located within Object-Based Storage Device 62.

Figure 3:
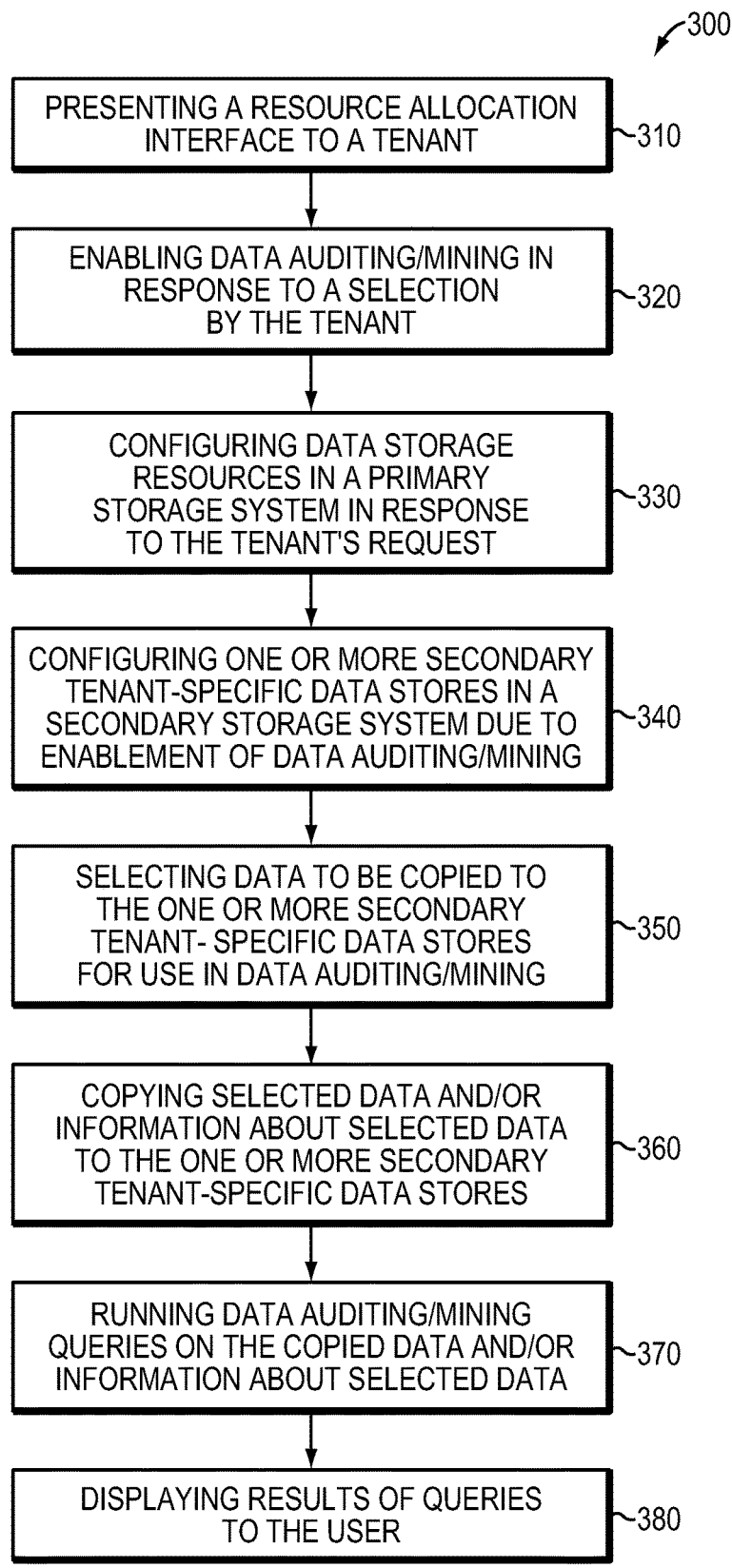
FIG. 3 illustrates steps that may be performed in accordance with the invention.

Referring to FIG. 3, flowchart 300 illustrates steps that may be performed in accordance with the current techniques. With reference to the example embodiment of FIG. 2, Tenant 30 may be presented with an application provisioning interface such as Configuration GUI 32 (Step 310). In some embodiments, Configuration GUI 32 may allow the tenant to enable auditing and mining of data associated with Tenant's 30 use of the to-be provisioned application (Step 320). For instance, Tenant 30 may be provided with a checkbox that when checked enables data auditing and mining of data associated with Tenant's use of the application to be provisioned.

In one embodiment, once Tenant 30 selects the necessary and desired configuration options for provisioning the application, a request is sent to Web Server 46. In response to the request, Web Server 46 may allocate the necessary resources to fulfill the request, for instance, by allocating the necessary storage resources in Primary Storage System(s) 58 for the associated application (Step 330). In some embodiments, Primary Storage System(s) 58 may complete the allocation process by using application-aware technology. Application-aware storage may be provided by a storage system with built-in intelligence about relevant applications and their utilization patterns. Thus, it is possible to optimize data layouts, caching behaviors, and quality of service (Qos) levels. For instance, Primary Storage System(s) 58 may select a most appropriate interface protocol to be used for the application that is being provisioned. Three such interface protocols are shown as File-Based Interface 50, Block-Based Interface 52, and Object-Based Interface 54 within Production Storage Device(s) 48 of FIG. 2. Thus, in the example embodiment of FIG. 2, data transmitted to Production Storage Device(s) 48 from Application Server 40 along Data Path 42 may be stored by way of one or more of these three interface protocols.

If data auditing and mining has been enabled, a tenant-specific data store may be provisioned to store auditable and minable data (Step 340). In some embodiments, such as the embodiment of FIG. 2, the store may be in the form of a virtual pool (e.g., VP 64*a*) within a secondary storage system (e.g., Secondary Storage System(s) 60) containing an object-based storage device (e.g., Object-Based Storage Device 62). As described above, a virtual pool may be restricted to a specific tenant and can provide a convenient mechanism for associating metadata with the content stored in the virtual pool. In another embodiment, depending on the capabilities of Primary Data Storage System(s) 58, the tenant-specific store may be located within the primary storage device such as found in Production Storage Device(s) 48 in FIG. 2. In some embodiments, the store may be logically and/or physically segregated from other data and stores.

In accordance with one embodiment of the current techniques, data stored within a main storage device may be selected for storage within a tenant-specific store based on policies that have been predefined and/or selected by a tenant (step 350). In the example embodiment of FIG. 2, the policies may be executed by Audit/Mining Support Logic 56. In one embodiment, Audit/Mining Support Logic 56 may be executable software.

In one embodiment, Audit/Mining Logic 56 may apply generally to all data or sets of data irrespective of the application and/or tenant the data is associated with. In another embodiment using an application-aware storage system, Audit/Mining Support Logic 56 may contain software that is application specific. In the latter embodiment, application-specific data may be selected based on application-specific policies. The policy, for instance, may select data associated with a particular application that has certain characteristics. In accordance with the current techniques, the characteristics may be used to identify auditable or minable data.

In yet another embodiment, the data that is selected may depend on options that may be provided to and selected by a tenant at Step 310 and Step 320. For instance, a tenant may decide to only select data that is relevant to mining. Or, a tenant may decide to only select auditable data with a specific characteristic. In some embodiments, the options that are available to the tenant may be determined based on the tenant's level of skill in regards to the relevant application. For instance, in one embodiment, a tenant that is considered an expert in regards to a particular application may have more auditing and mining options available to choose from than a tenant that is considered a novice.

Depending on the particular embodiment, the data selection process may be done, for example, automatically on a periodic basis, upon a triggering even, or when requested. Also, the selection process may consider, for example, only data currently stored within the storage system or it may also consider relevant I/O requests.

Once a selection of data has been made based on the provided policies, a copy of the selected data and/or information obtained from the selected data is stored in the tenant-specific store (Step 360). Referring again to FIG. 2, a copy of or information obtained from the data selected by Audit/Mining Support Logic 56 is stored in Tenant's 30 exclusive virtual pool (VP 64*a*). In the embodiment of FIG. 2, the data being stored in VP 64*a* may have a unique object identifier associated with the data content such as discussed above with regards to the XAM standard. Also, in some embodiments, the data being stored may be stored with a specific retention attribute.

Data stored in the tenant-specific store, e.g., VP 64*a*, may be used for data analysis, such as data auditing and mining (Step 370). In one embodiment, Tenant 30 may request that his cloud service provider perform an audit or mining operation on Tenant 30's data or a selection of Tenant 30's data. In another embodiment, Tenant 30 may be provided with the ability to perform data auditing or mining through an interface such as Tenant Audit/Mining GUI 34. In some cases, Tenant 30 may be an entity that provides, for example, software as a service to its customers whom may also be provided with an auditing and/or mining interface.

Depending on the particular embodiment, various auditing and/or mining options may be provided. For instance, a tenant may select to audit or mine data that was stored in a primary storage system within a specific time period or a tenant may select to mine only data related to I/O errors. A tenant may select to audit and mine all of the tenant's auditable and minable data. Once a tenant makes an audit or mining request through an interface such as Tenant Audit/Mining GUI 34, the interface obtains all of the relevant information from the relevant tenant-specific store such as VP 64*a*. In some embodiments, the relevant information may be obtained by using XAM queries. In some embodiments, once the relevant information is obtained, data analysis may be performed and the results displayed to the user along side other relevant information (Step 380).

Figure 5:
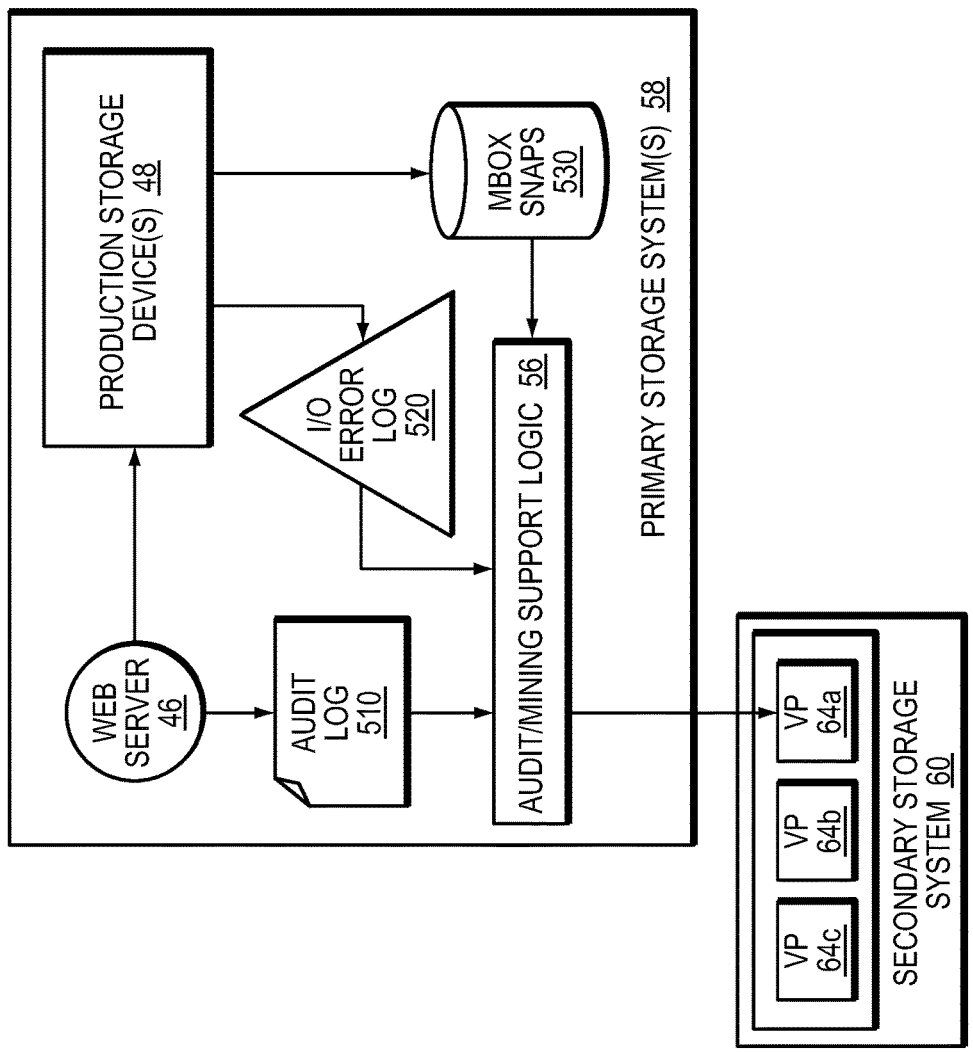

FIG. 4 and FIG. 5 are provided as an example embodiment of the current techniques, as described above, specific to an email application such as MICROSOFT EXCHANGE. FIG. 4 is a screenshot of an example email application allocation wizard utilizing the current techniques. In at least one embodiment, a user may be provided with email allocation configuration GUI window 410. Among the configuration options presented to the user, the user may be presented with an Audit/Mining option as depicted in GUI 410 as checkbox 420. If the user selects Audit/Mining checkbox 420 and then clicks finish button 430, the email application is configured to enable data auditing/mining for the data associated with this newly allocated email application. Otherwise, data auditing/mining is not enabled.

If data auditing/mining is enabled in the email application embodiment described above, corresponding email application-specific audit/mining support logic as contained, in some embodiments, in Audit/Mining Support Logic 56 of FIG. 2, may be used to determine which data associated with the email application is auditable/minable. The auditable/minable data may then be copied to a tenant-specific store such as VP 64*a* in Secondary Storage System(s) 60.

FIG. 5, an example embodiment of an email application-specific view of Primary Storage System(s) 58 and Secondary Storage System(s) 60 of FIG. 2, illustrates possible email-specific auditable/minable data. A user of an email application, for example, may need information related to changes that have occurred in various mailboxes created during the email allocation and configuration. In some embodiments, this may be achieved by using snapshots (i.e., capturing the state of the system at a specific point in time) of the mailboxes. MBOX Snaps 530 in FIG. 5, representing captured snapshots of one or more email mailboxes, can then be compared, in some embodiments, to previously stored data in VP 64*a* to determine differences. In at least one embodiment, the differences can then be copied to VP 64*a*.

In some embodiments, a user may then analyze the data through Tenant Audit/Mining GUI 34. For example, some embodiments may allow the user to conduct inbound or outbound email audits using numerous search parameters such as a date or a sender's email address. The user may then be provided with information pertaining to email messages satisfying the search parameters, e.g., the status of an email message.

In some embodiments, more comprehensive auditing/mining capabilities may be achieved by copying data ancillary to the allocated application to the tenant-specific store. For instance, as illustrated in FIG. 5 by Audit Log 510 and I/O Error Log 520, information obtained from a web server audit log and/or an I/O error log may be copied to the tenant-specific store. Such logs, in addition to other auditable/minable data, may provide information from multiple sources. For example, Audit Log 510 and I/O Error Log 520 may contain I/O related data corresponding to various Storage Cloud 20 components. Error Log data can be used to satisfy audit requests. In addition, performance log data can also be gathered (and subsequently mined) to satisfy requests to understand the performance characteristics of an email application such as MICROSOFT EXCHANGE.

Any application can utilize the current techniques to provide tailored data analysis by having, in a particular embodiment, application-specific audit/mining support logic as illustrated with the email application embodiment discussed above. In an alternative embodiment where no audit/mining support logic is provided for a particular application, the logic may be added to the storage cloud or generic audit/mining support logic may be used. It should also be noted that the current techniques should not be limited to data auditing/mining. The current techniques may be used for any type of electronic data analysis.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in analyzing tenant-specific data, the method comprising:
presenting a configuration graphical user interface (GUI) to a first tenant in a first multi-tenant data storage system having a storage processor, wherein the configuration GUI includes an application provisioning interface for provisioning a specific application;
selecting, via the configuration GUI, an application for provisioning, wherein selecting includes selecting configuration options associated with the selected application and enabling data auditing and data mining associated with the first tenant's use of the application to be provisioned;
allocating storage system resources associated with the selected application, wherein allocating includes selecting a particular interface protocol based on the selected application, wherein the interface protocol is a block-based interface, file-based interface, or an object-based interface;
enabling, via the configuration GUI, data auditing and data mining associated with the selected application prior to provisioning the selected application;
storing, in the first multi-tenant data storage system, first data for the first tenant and second data for a second tenant, wherein the first tenant is isolated from the second tenant;
selecting a first portion of the first data, wherein selecting is based the selected configuration options associated with the application;
based on the selection, copying the first portion of the first data to a data store located in a second multi-tenant data storage system that is specific to the first tenant, wherein the second multi-tenant data storage system is an application-aware object-based data storage system; and
applying data analysis techniques to the data store.

2. The method of claim 1, wherein the selecting of the first portion of the first data is based on the first portion's association with an application.

3. The method of claim 1, wherein the selecting of the first portion of the first data is based on a user selection.

4. The method of claim 1, wherein the data store is an object-based data storage device.

5. The method of claim 1, wherein the data store comprises a virtual pool.

6. The method of claim 5, wherein the virtual pool is associated with the first tenant.

7. The method of claim 1, wherein the data store is located within the multi-tenant data storage system.

8. The method of claim 1, wherein the data store is physically separated from the multi-tenant data storage system.

9. The method of claim 1, wherein the selecting of a first portion of the first data is performed on a periodic basis.

10. The method of claim 1, wherein the selecting of a first portion of the first data is performed upon an I/O request.

11. The method of claim 1, wherein the selecting of a first portion of the first data is performed upon a user request.

12. The method of claim 1, wherein the applying of data analysis techniques to the data store is performed upon a request by the first tenant.

13. The method of claim 1, wherein the applying of data analysis techniques to the data store is performed on a periodic basis.

14. A system for use in analyzing tenant-specific data, the system comprising:
first logic configured to:
present a configuration graphical user interface (GUI) to a first tenant in a first multi-tenant data storage system having a storage processor, wherein the configuration GUI includes an application provisioning interface for provisioning a specific application;
select, via the configuration GUI, an application for provisioning, wherein selecting includes selecting configuration options associated with the application and enabling data auditing and mining;
allocate storage system resources associated with the selected application, wherein allocating includes selecting a particular interface protocol based on the selected application;
enable, via the configuration GUI, data auditing and mining data associated with the selected application prior to provisioning the selected application; and store, in the first multi-tenant data storage system, first data for the first tenant and second data for a second tenant, wherein the first tenant is isolated from the second tenant;

second logic configured to select a first portion of the first data, wherein selecting is based the selected configuration options associated with the application;

third logic configured to copy the first portion of the first data to a data store located in a second multi-tenant data storage system that is specific to the first tenant, wherein the second multi-tenant data storage system is an application-aware object-based data storage system; and fourth logic configured to apply data analysis techniques to the data store.

15. The system of claim 14, wherein the selecting of the first portion of the first data is based on the first portion's association with an application.

16. The system of claim 14, wherein the selecting of the first portion of the first data is based on a user selection.

17. The system of claim 14, wherein the data store is an object-based data storage device.

18. The system of claim 14, wherein the data store comprises a virtual pool.

19. The system of claim 18, wherein the virtual pool is associated with the first tenant.

20. The system of claim 14, wherein the data store is located within the multi-tenant data storage system.

* * * * *